(12) United States Patent
Sekharan (10) Patent No.: US 10,999,399 B2
(45) Date of Patent: May 4, 2021

(54) OFFLINE USE OF NETWORK APPLICATION

(71) Applicant: SAP SE, Walldorf (DE)

(72) Inventor: Satishkumar Sekharan, Coquitlam (CA)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 15/666,970

(22) Filed: Aug. 2, 2017

(65) Prior Publication Data

US 2019/0045026 A1 Feb. 7, 2019

(51) Int. Cl.
*H04L 29/08* (2006.01)
*G06F 16/955* (2019.01)
*G06F 3/048* (2013.01)

(52) U.S. Cl.
CPC .............. *H04L 67/32* (2013.01); *H04L 67/02* (2013.01); *H04L 67/2861* (2013.01); *G06F 3/048* (2013.01); *G06F 16/955* (2019.01)

(58) Field of Classification Search
CPC ..... H04L 67/32; H04L 67/02; H04L 67/2861; G06F 16/955; G06F 3/048
See application file for complete search history.

(56) References Cited

U.S. PATENT DOCUMENTS

| | | | | |
|---|---|---|---|---|
| 5,892,908 | A * | 4/1999 | Hughes | G06F 16/957 709/250 |
| 6,667,751 | B1 * | 12/2003 | Wynn | G06F 16/955 715/833 |
| 7,730,155 | B1 * | 6/2010 | Meyer | H04W 4/02 709/201 |
| 2002/0078197 | A1 * | 6/2002 | Suda | G06F 16/95 709/224 |
| 2004/0059809 | A1 * | 3/2004 | Benedikt | G06F 16/951 709/224 |
| 2011/0307799 | A1 * | 12/2011 | Aronov | G06F 11/3688 715/744 |
| 2013/0132833 | A1 * | 5/2013 | White | G06F 3/048 715/704 |
| 2016/0234331 | A1 * | 8/2016 | Childress | H04L 67/2842 |
| 2016/0328485 | A1 * | 11/2016 | Dodonov | G06F 16/9574 |
| 2017/0024451 | A1 * | 1/2017 | Sullivan | G06F 16/273 |
| 2020/0242177 | A1 * | 7/2020 | Holloway | G06Q 30/0251 |

\* cited by examiner

*Primary Examiner* — Viet D Vu
(74) *Attorney, Agent, or Firm* — Buckley, Maschoff & Talwalkar LLC (57) ABSTRACT

A system includes display of user interface, detection of a UI event associated with the user interface, interception of a request to a network triggered by the UI event, generation of a cache key based on the UI event, reception of a response to the request from the network, generation of a data structure including the response, and storage of the data structure in the persistent storage system in association with the cache key.

14 Claims, 10 Drawing Sheets

OFFLINE USE OF NETWORK APPLICATION

BACKGROUND

A computing system may execute a client application to access data and functionality of a remote server system. For example, a client system may execute a Web browser to request and receive Web pages from a Web server located on the World Wide Web. This operation relies on the existence of a network connection between the client system and the remote server system. Systems are desired to efficiently preserve some functionality of a client application in the absence of a network connection to a corresponding remote server system.

DETAILED DESCRIPTION

The following description is provided to enable any person in the art to make and use the described embodiments. Various modifications, however, will remain readily-apparent to those in the art.

Generally, some embodiments acquire and store all user interface (UI) events of a client application which are triggered by a user's actions, and all resulting network requests and responses, into an offline data structure. The stored responses may be used to provide appropriate responses to UI events in the client application when the client application is operating in an offline mode. Storage of the UI events allows the client application to replay the UI events in the future on the user's behalf in order to update/refresh the requests and responses of the offline data structure.

Figure 1A:
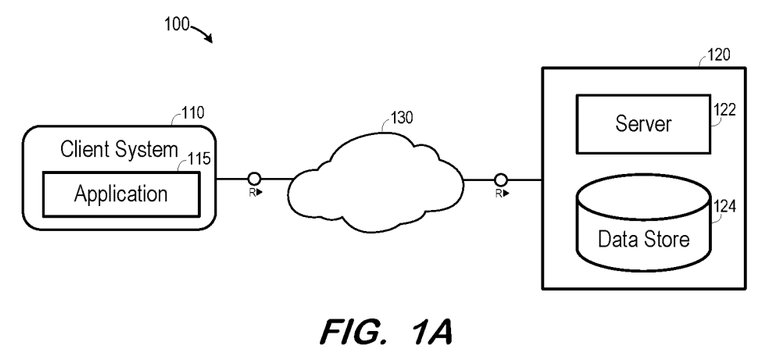
FIGS. 1A and 1B comprise block diagrams of a system architecture according to some embodiments.

FIG. 1A is a block diagram of networked system 100 according to some embodiments. Embodiments are not limited to the FIG. 1 system. System 100 includes client system 110 and backend system 120 in communication via network 130. Network 120 may comprise the World Wide Web and/or any number of intermediate public or private networks.

According to some embodiments, client system 110 may execute client application 115 to request data from backend system 120. Server 122 of backend system 120 receives the request and generates a response based on its internal programming and applications and on data stored in data store 124, and provides the response to client system 110. Application 115 processes the response, for example, by presenting a UI based on the response.

In one particular example, server 122 may comprise a Web server and application 115 may comprise a Web browser which execute code of a Web application within its virtual machine. Execution of the code of the Web application may cause client system 110 to issue HyperText Transfer Protocol (HTTP) requests to backend system 120, to receive HTTP responses from backend system 122, and to render Web pages on a display based on the responses.

Data store 124 may comprise any data sources which are or become known, including but not limited to database views, spreadsheets, relational databases and/or OnLine Analytical Processing cubes. Server 122 may be separated from or closely integrated with data store 124 and its associated database management system (not shown). A closely-integrated server 122 may enable execution of applications completely on the database platform, without the need for an additional server.

Figure 1B:
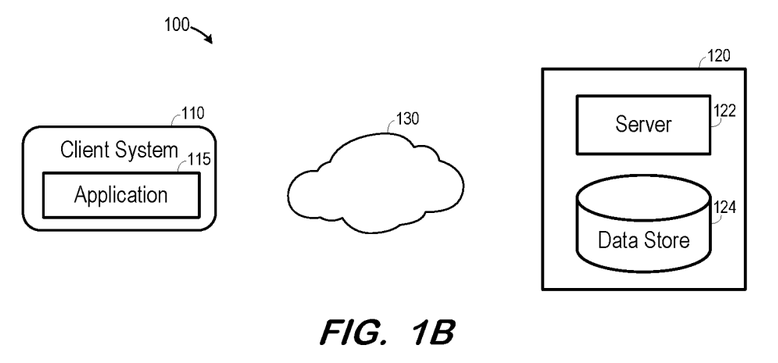

FIG. 1B is a block diagram illustrating offline operation of client system 110 according to some embodiments. Offline operation describes a scenario in which client system 110 is unable to receive data from backend system 120. This scenario may arise due to a break in the communication link between system 110 and network 130, due to a break in the communication link between and network 130 and system 120, and/or a discontinuity in any intermediate network. For example, client system 110 may comprise a mobile device which is out of range from a wireless or cellular network. In other examples, an internet provider of client system 110 and/or or system 120 may be experiencing an outage, or backend system 120 may be offline due to a crash or maintenance.

Figure 2:
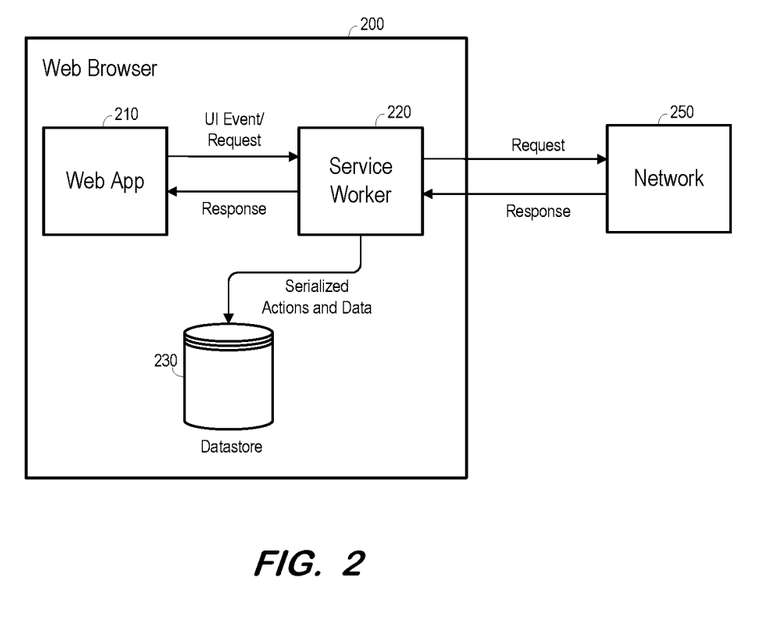
FIG. 2 is a block diagram of a client application according to some embodiments.

FIG. 2 is a block diagram of a runtime system according to some embodiments. Web browser 200 represents application code being executed by a processing unit(s) of a client computing system. Web browser 200 supports at least one execution thread to execute Web application 210 and a service worker thread to execute service worker 220. As will be described below, service worker 220 intercepts UI events and requests (e.g., HTTP requests) sent from Web application 210 to network 250, forwards the requests to network 250, and also intercepts responses received from network 250 prior to forwarding the responses to Web application 210. Each UI event and its resulting request and response is stored in a data structures within local datastore 230. Datastore 230 is a persistent storage within web browser 200. According to some embodiments, the event, request and response are serialized into a script and stored in association with a unique identifying cache key in a local indexedDB database.

Service worker 220 may be implemented by program code utilizing the Service Worker API of conventional browser implementations. The Service Worker API is an event-driven Web Worker, which responds to events and behaves as a scriptable forward proxy in Web browser 200. Service Worker 220 resides between the page renderer and the network process of Web browser 200 to mediate all communication with network 250. Service Worker 220 may run independently on a separate thread and does not interfere with the execution of Web application 210. According to some embodiments, Service Worker 220 is a custom script that is registered with Web browser 200 using the Service Worker API. The script is loaded and registered during the initial loading of Web application 210. The registration step triggers Web browser 200 to install the custom script in the background.

Service worker 220 may take appropriate action based on whether network 250 is available. In some embodiments, service worker 220 comprises a JavaScript file that is associated with a web page/site, intercepts navigation and resource requests bound for the site, and caches resources in datastore 230 or uses such cached resources as appropriate.

For example, and as will described in detail below, service worker 220 may receive a request from Web application 210 and determine that network 250. Accordingly, service worker 220 may retrieve a previously-stored response (e.g., images, Cascading Style Sheets and JavaScript resources required for Web application 210 to load) associated with the received request from datastore 230, and provide the stored response to Web application 210 for rendering thereof.

Figure 3:
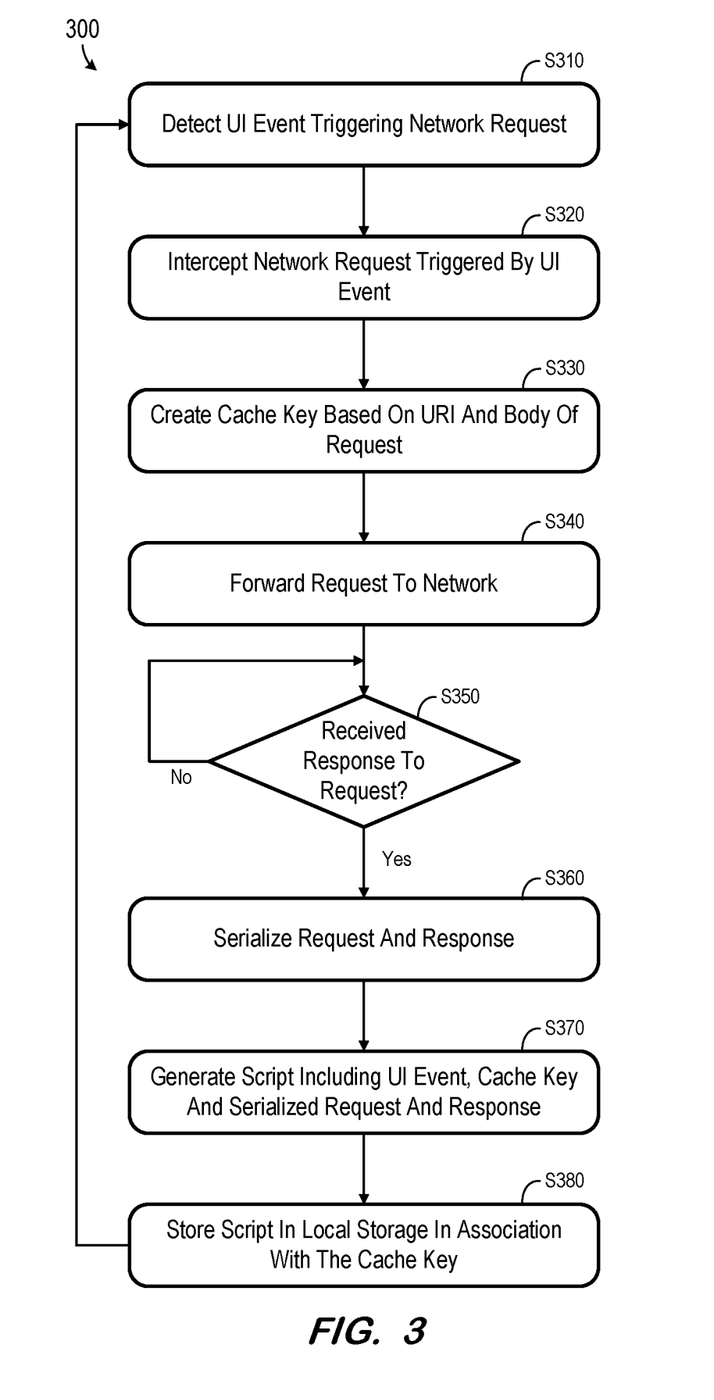
FIG. 3 is a flow diagram of a process to generate and store offline data scripts according to some embodiments.

FIG. 3 comprises a flow diagram of process 300 to populate a local cache with offline network data according to some embodiments. Process 300 may be performed by service worker 220 in some embodiments. In this regard, process 300 may be performed executing code of a web application in the execution engine of a runtime environment, where the executed code is intended to be executed by a service worker thread and utilizes a Service Worker API provided by the runtime environment.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, a UI event which triggers a network request is detected. The UI event may comprise user interaction with a displayed UI. For example, the detected UI event may comprise user selection of a displayed hyperlink. As is known in the art, selection of a hyperlink may trigger a request (e.g., a request for a new Web page) to a remote Web server.

Figure 4:
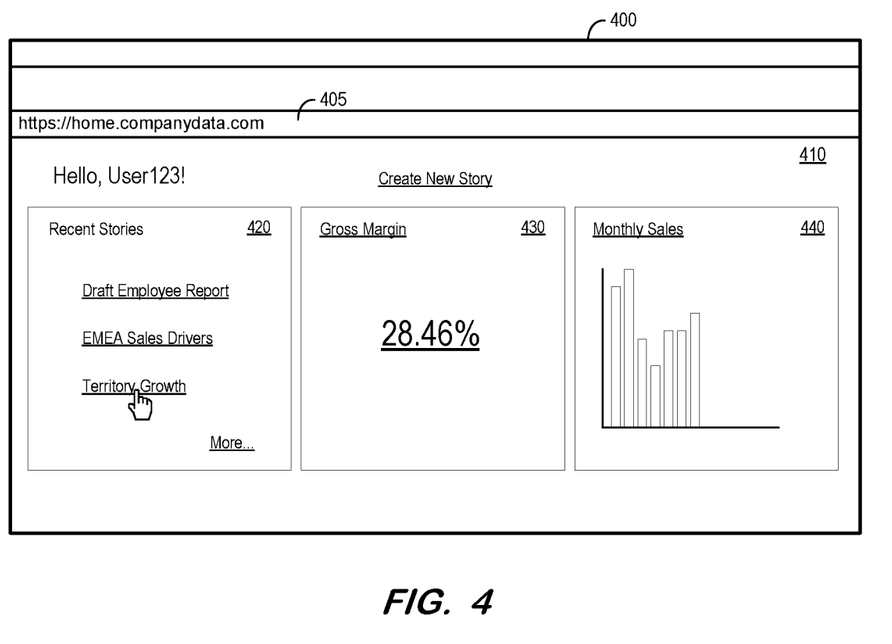
FIG. 4 is a view of a user interface of a client application according to some embodiments.

FIG. 4 illustrates application UI 400 according to some embodiments. Application UI 400 may be presented on a display of a client system in response to execution of a Web browser. UI 400 includes address bar 405 including a Uniform Resource Identifier (URI). As is known in the art, entry of the URI into address bar 405 causes the Web browser to request a particular Web page from a Web server associated with the URI. Assuming the client system is online (i.e., in communication with a network which is in communication with the associated Web server), the Web page is returned to the client and displayed as Web page 410 within application UI 400.

Web page 410 provides an interface to view and access enterprise data stored on a remote network, but embodiments are not limited thereto. Web page 410 includes various regions 420, 430 and 440 including selectable hyperlinks. As illustrated, the present example assumes user selection of a hyperlink labeled "Territory Growth", which is associated with an underlying URI as is known in the art. Selection of the hyperlink triggers a network request based on the underlying URI. Accordingly, selection of the hyperlink is detected as a UI event at S310.

The triggered network request is intercepted at S320. For example, the network request may be intercepted using service worker functionality provided by the aforementioned Service Worker API. All requests for static resources such as images, Custom Style Sheets and JavaScript resources may be intercepted using the Service Worker API and cached using the CacheStorage API. In contrast, for dynamic data requests, the IndexedDB store is used because the Service Worker API does not allow caching of HTTP POST requests using CacheStorage API.

For all data requests, a cache key is created at S330 based on the URI and on the body of the request. In some embodiments, a key is generated at S330 using a hash of the request URI and the request body. This unique cache key serves as an index to a datastore in which the intercepted requests (and responses) are stored.

In this regard, the intercepted request is forwarded to the network (as illustrated in FIG. 2) at S340, and flow cycles at S350 until a response to the request is received from the network.

After receiving the response from the network, the request and the response are serialized at S360. Serialization may facilitate structured storage of the request and response for later use as will be described below. Next, at S370, a script is generated including the UI event, the cache key and the serialized request and response. The script may comprise a JavaScript Object Notation (JSON) script according to some embodiments. The following is an example of a script format according to some embodiments:

```
{
    "version": "1.0"
    "agent": "<UserAgentString>",
    "page": {
        "title": "",
        "url": "",
        "actions": [
            {
                "selector": "<DOM query selector>",
                "event": {
                    "name": "<UI Event name>",
                    "type": "<UI Event type>",
                }
            },
            ...
        ],
        "data": {
            "<UniqueCacheKey>": {
                "request": "<serialized_request_object>",
                "response": "<serialized_response_object>"
            }
        }
    }
}
```

As shown above, the script includes the title and URI of the Web page in which the UI event was received, as well as an actions property including details of the UI event and a data property including the cache key in association with a serialized request object and a serialized response object. Embodiments may conform to a different script format and include less or more information than shown in the example above.

Next, at S380, the script is stored in a local storage in association with the cache key. In some embodiments, the script is stored in an IndexedDB database with the cache key utilized as a database key to the stored script. As described above, the IndexedDB database is local to the Web browser and access to the IndexedDB database by the browser is facilitated using known protocols. The script may be stored in any storage system or device to which the client system has offline access.

As mentioned above, process 300 may be executed to populate a cache with offline scripts as described above.

Figure 5:
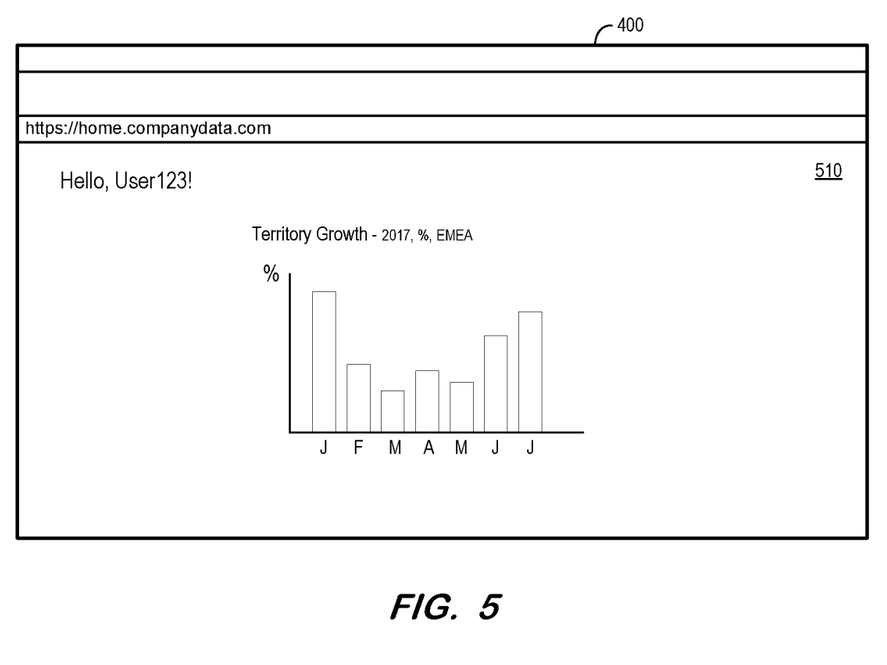
FIG. 5 is a view of a user interface of a client application according to some embodiments.

Accordingly, process 300 may simply return to S310 from S380 to detect a next UI event. Process 300 may also be executed to populate the cache in a transparent manner during normal online user operation. In this regard, after storing the script at S380, the received response may be forwarded to the page rendering thread of the executing Web application to render a Web page based on the response. For example, FIG. 5 shows Web page 510 rendered within application UI 400 in response to selection of the 'Territory Growth" hyperlink.

Figure 6A:
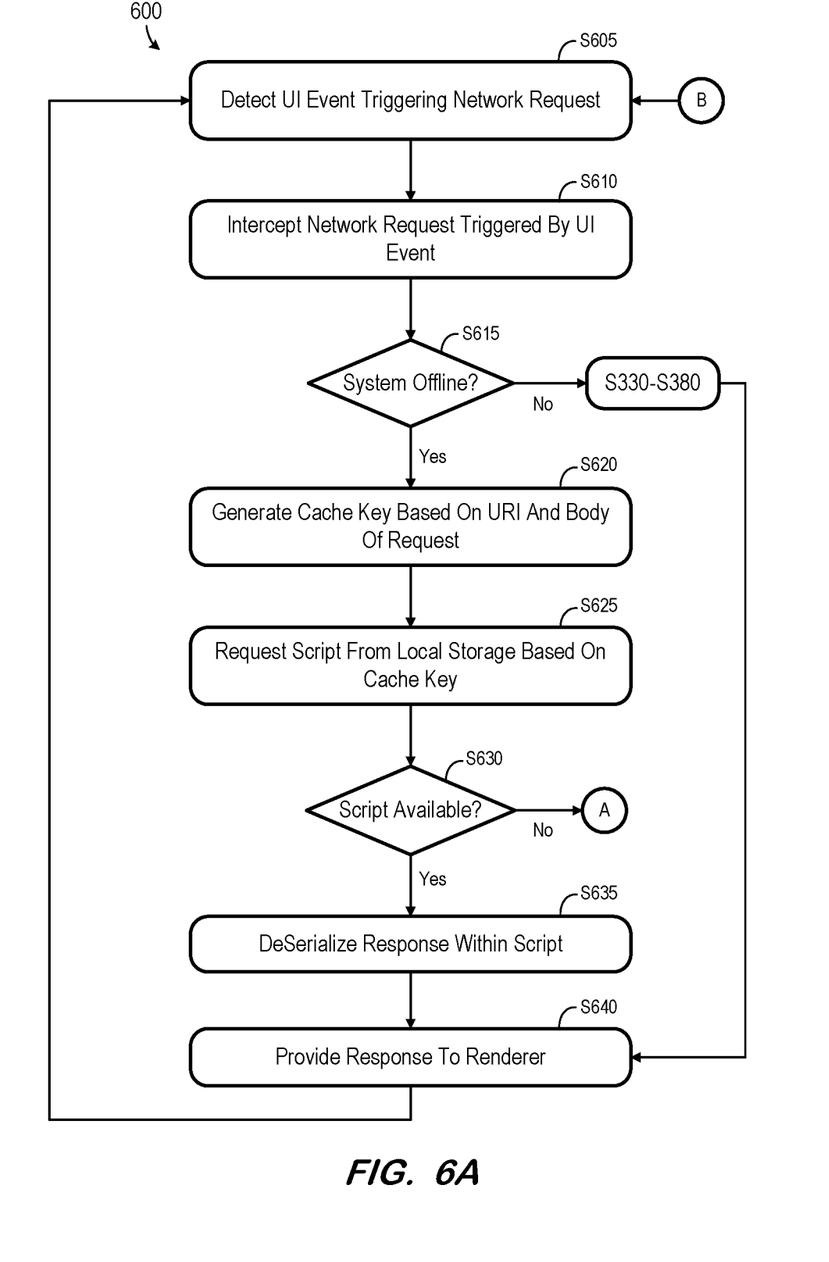
FIGS. 6A and 6B comprise a flow diagram of a process to use offline data scripts according to some embodiments.
Figure 6B:
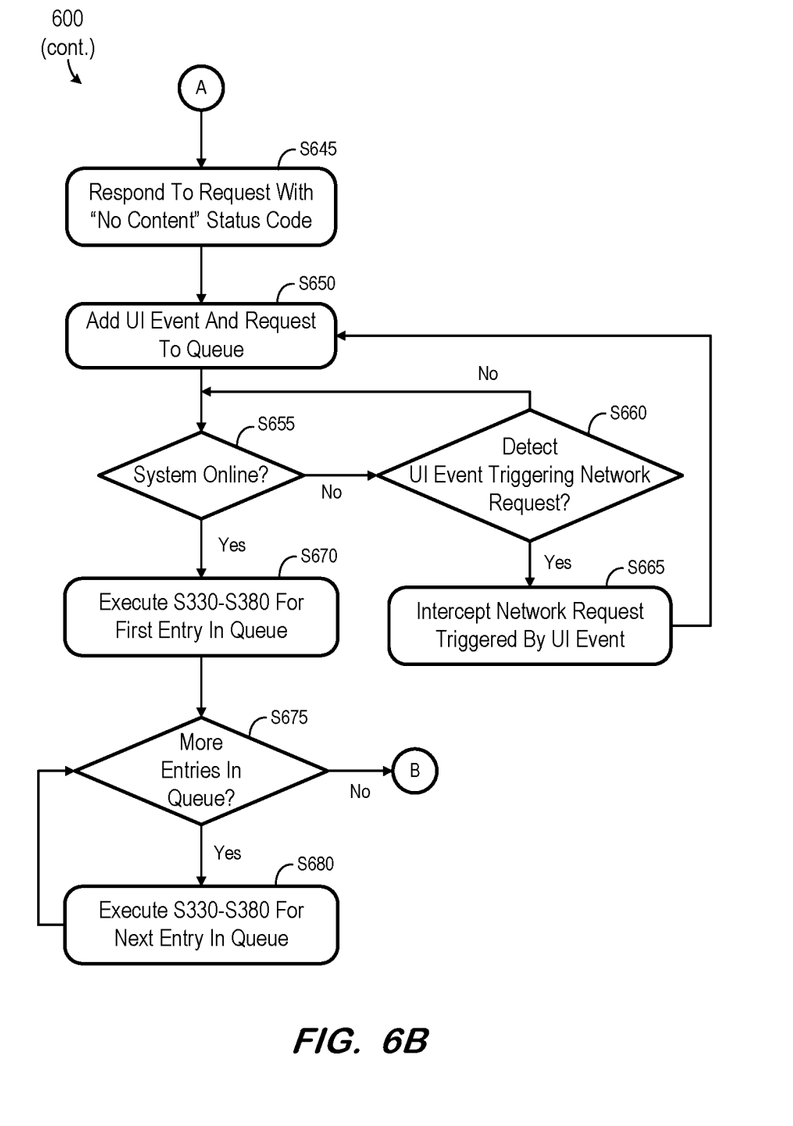

FIGS. 6A and 6B depict process 600 according to some embodiments. Process 600 provides offline as well as online operation of a client application according to some embodiments. S605 and S610 may proceed as described above to detect a UI event and to intercept a network request which is triggered by the UI event.

At S615, it is determined whether the client system is offline. As described above, any number of conditions may result in an offline state, each of which prevents the client system from receiving data from the network from which information is being requested. If it is determined that the client system is not offline (i.e., the client system is online), flow proceeds to S330 through S380 of process 300 to generate and store an offline script as described above. The intercepted response is then provided to the renderer at S640 for rendering of a UI (e.g., a Web page) based on the response. Accordingly, the above operation provides transparent generation of storage of offline scripts during normal operation of the client application as described above. Flow then returns to S605 to detect another UI event.

Flow proceeds from S615 to S620 if it is determined that the system is offline. At S620, a cache key is generated based on the URI associated with the detected UI event and the body of the request. The cache key may be generated using the same hash function used to generate the cache key of the stored script objects. Accordingly, a script is requested from local storage at S625 based on the generated cache key. For example, the cache key may be passed to a local IndexedDB database, which attempts to locate a stored script object for which the cache key is its database key. S625 therefore attempts to locate a script object which was previously-stored in response to a same UI event and request as were detected at S605 and S610.

If a script corresponding to the cache key is available in the local storage, the response stored within the script is deserialized at S635. The deserialized response is provided to the renderer at S640. By virtue of the above-described processes, the deserialized response is the same response as was previously-received from the network in response to the same UI event and request. Accordingly, assuming the rendering code has remain unchanged, the UI rendered after S640 is the same as during prior online operation.

It is now assumed that selection of the 'Territory Growth" hyperlink was detected at S605 and that the client system was determined to be offline at S615. Accordingly, since the UI event and triggered request are the same as previously-described, the cache key generated at S620 is identical to the cache key used to store the script object associated with the UI event and request. This script object is retrieved and its included response is deserialized at S635.

Figure 7:
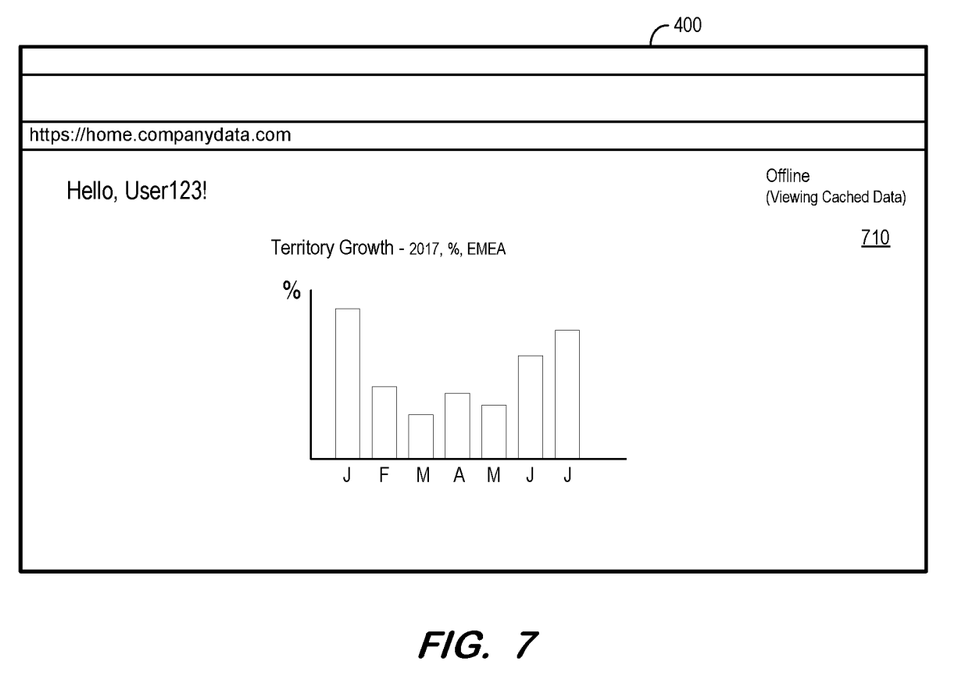
FIG. 7 is a view of a user interface of a client application according to some embodiments.

FIG. 7 illustrates application UI 400 rendering the deserialized response during offline operation according to some embodiments of the present example. Web page 710 is rendered based on the same response on which Web page 510 is rendered. Web page 710 also includes a message indicating that the client system is offline and that Web page 710 is rendered based on cached data. Any suitable offline indicator may be utilized according to some embodiments.

Returning to process 600, flow proceeds to S645 if it is determined at S630 that a script corresponding to the generated cache key is not available in local storage. Lack of script availability indicates that no response corresponding to the detected UI event and intercepted request has been cached locally. At S645, service worker 220 responds to the request with a status code indicating that the server has successfully fulfilled the request and that there is no additional content to send in the response payload body (e.g., a 204 "no content" status code). As a result, Web application 210 ceases waiting for a response and does not display an error page, allowing continued normal operation.

The last-detected UI event and last-intercepted request is added to a queue at S650 and it is determined whether or not the client system is back online at S655. If not, flow cycles between S660 and S655 to wait for either another detected UI event (e.g., user selection of another hyperlink) or an indication that the client system is back online. If another UI event is detected, the resulting triggered request is intercepted at S665 and the event and request are added to the queue at S650. Accordingly, the queue collects UI event and triggered responses in temporal order while the client system is offline.

Once it is determined that the system is online at S655, flow continues to S670 to execute S330 through S380 of process 300 with respect to the first UI event and response in the queue. Accordingly, a script is generated and stored for the first UI event and response as described above. Similarly, flow cycles through S675 and S680 to generate and store a script for each other UI event/response in the queue. Flow returns to S605 after each entry in the queue is processed. S645 through S680 thereby provide proactive fetching of responses to requests made by the user in offline mode, by recording UI events which occur during offline operation in sequential order, and replaying of associated requests and storing resulting responses as described above.

Figure 8:
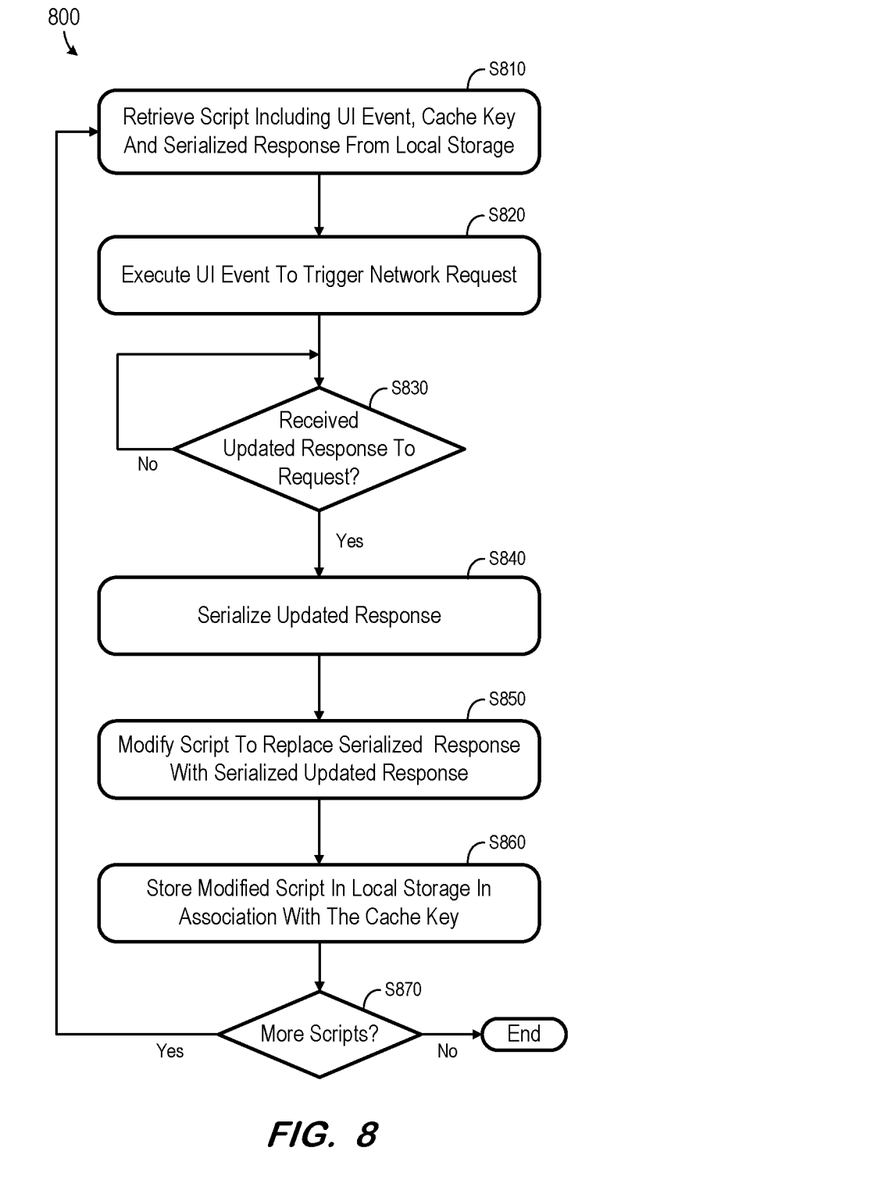
FIG. 8 is a flow diagram of a process to update offline data scripts according to some embodiments.

FIG. 8 is a diagram of process 800 to update/refresh previously-stored script objects according to some embodiments. As such, process 800 may be performed according to a preset or dynamic schedule, and is executed while the client system is online. The schedule may depend upon usage, data velocity or other characteristic of the associated network application, and/or relevant characteristic of the client system. At S810, a stored script object is retrieved. The script object, as described above, is stored locally and includes a UI event a cache key, and a serialized response.

At S820, the UI event is read from the retrieved script object and is executed in order to trigger a corresponding network request. Execution of the UI event therefore causes the Web application to respond as if the UI event was executed in response to a user action. Flow cycles at S830 until a response to the request is received from the network.

Once received, the response, which will be referred to herein as the updated response, is serialized at S840. The retrieved script is then modified at S850 to replace the serialized response which was present in the retrieved object with the serialized updated response. The modified script object is stored locally in association with the cache key at S860.

According to some embodiments, a new script object is generated at S850 as described above by generating a cache key based on the UI event and triggered request, and populating the new script object with the UI event, serialized request and serialized updated response. The new script object is stored locally in association with the cache key at S860. Generation of a new cache key and script object at S850 may address scenarios in which the Web application was changed since storage of the script object so as to generate a different response to the UI event than that represented in the script object.

At S870, it is determined whether there are more locally-stored scripts to be updated. If so, flow returns to S810 and continues as described above. The determination at S870 may be based on a timestamp of each stored script (e.g., scripts stored after date/time X are not updated, while scripts stored before date/time Y are updated). If there are no more scripts to be updated, flow terminates.

Figure 9:
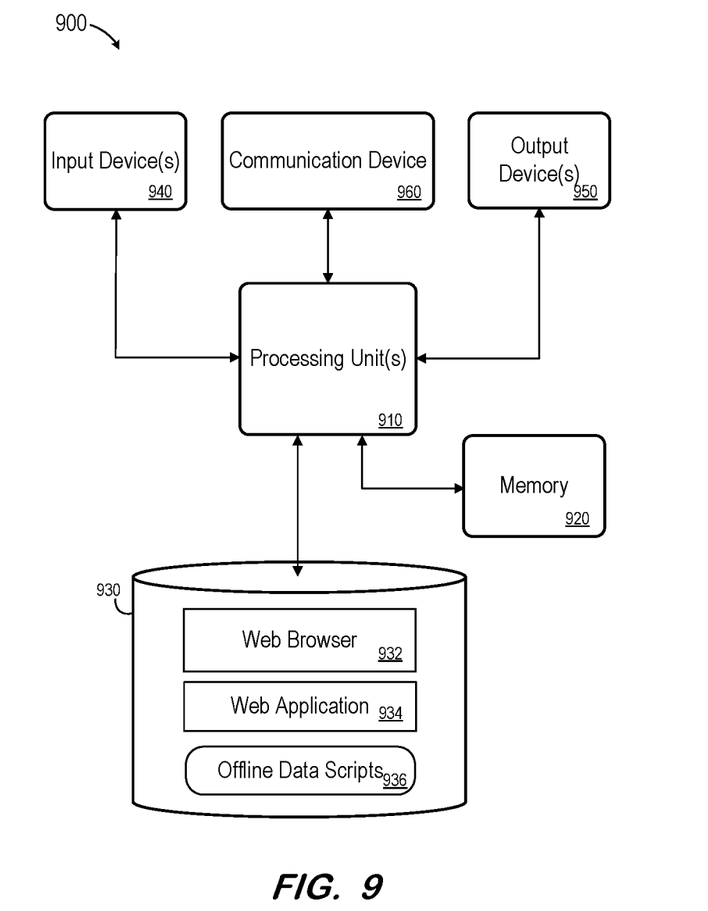
FIG. 9 is a block diagram of a client computing system according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of client system 110. Apparatus 900 may include other unshown elements according to some embodiments.

System 900 includes processing unit(s) 910 and memory 920 storing code for execution by processing unit(s) 910. Processing unit(s) 910 may comprise any combination of microprocessor, controller, gate arrays, processor cores, or other hardware suitable to execute program code. Memory 920 may comprise random access memory, cache memory, or other suitable memory, and may comprise volatile, non-volatile, and/or storage-class memory (e.g., non-volatile random access memory).

Storage device 930 may comprise a fixed disk drive, a solid-state drive, a Flash drive and/or any other suitable storage medium. According to some embodiments, storage device 930 includes program code of various applications for loading into memory 920 and execution by processing unit(s) 910. For example, storage device 930 stores program code of Web browser 932 and Web application 934. The program code of Web browser 932 may be executed to provide a virtual machine (e.g., a Java Virtual Machine) to execute Web application 934 and to thereby cause system 900 to operate as described herein. Accordingly, Web application 934 may comprise, in some embodiments, compiled classes suitable for execution by a virtual machine. Web application 934 may comprise both Web application 210 and program code of service worker 220 which utilizes a Service Worker API as described herein.

Data storage device 930 also stores offline data scripts 936 generated as described herein. Offline data scripts 936 may be stored in any suitable storage format or system. Data storage device 930 may also store data and other program code for providing additional functionality and/or which are necessary for operation of apparatus 900, such as device drivers, operating system files, etc.

Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to interact with a UI so as to cause UI events. Output device(s) 950 may comprise, for example, a display (e.g., a display screen) a speaker, and/or a printer. Communication device 960 may facilitate communication with external devices, such as a reporting client, or a data storage device.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a persistent storage system;
a display;
a memory storing processor-executable process steps; and
a processor to execute the processor-executable process steps to:
    display a user interface on the display;
    detect a User Interface (UI) event associated with the user interface;
    intercept a request to a network triggered by the UI event;
    generate a cache key based on the UI event;
    receive a response to the request from the network;
    serialize the response, wherein serialization converts the response to a different structured form for storage and deserialization is applied offline to the serialized response before the response is provided to a renderer, wherein the deserialized response is the same as the received response;
    generate a script object including an executable UI event, a Uniform Resource Identifier of the user interface event, the serialized response, a name of the UI event, and a type of the UI event;
    store the script object in the persistent storage system in association with the cache key;
    detect a second UI event associated with the user interface; and
    determine that the system is offline;
    in response to the determination that the system is offline:
        generate a second cache key based on the second UI event;
        request the script object from the persistent storage system based on the second cache key, where the second cache key is identical to the cache key;
        receive the script object from the persistent storage system;
        identify the response included in the script object; and
        display an image on the display based on the identified response.

2. A system according to claim 1, wherein generation of a cache key comprises generation of the cache key based on a body of the request and on a Uniform Resource Identifier associated with the request.

3. A system according to claim 1, wherein generation of the script object comprises serialization of the request and generation of the script object including the serialized response and the serialized request.

4. A system according to claim 1, wherein generation of a cache key comprises generation of the cache key based on a body of the request and on a Uniform Resource Identifier associated with the request, and
wherein generation of the second cache key comprises generation of the second cache key based on a body of a second request associated with the second UI event and on a second Uniform Resource Identifier associated with the second request.

5. A system according to claim 1, the processor to execute the processor-executable process steps to:
retrieve the script object from the persistent storage system;
determine the UI event based on the retrieved script object;
execute the UI event to trigger a second request to the network;
receive a second response to the second request from the network;
serialize the second response;
generate a second script object including the Uniform Resource Identifier of the user interface, the serialized second response, the name of the UI event, and the type of the UI event;
generate a third cache key based on the second request; and
store the second script object in the persistent storage system in association with the third cache key.

6. A system according to claim 1, the processor to execute the processor-executable process steps to:
detect a third UI event associated with the user interface;
determine that the system is offline;
in response to the second determination that the system is offline:
generate a third cache key based on the third UI event;
determine that no script object is stored in the persistent storage system in association with the third cache key;
transmit a no content code in response to a second request triggered by the third UI event; and
add the third UI event and second request to a queue;
determine that the system is online; and
in response to the determination that the system is online:
execute the third UI event to trigger the second request to the network;
receive a third response to the second request from the network;
serialize the third response;
generate a second script object including the Uniform Resource Identifier of the user interface, the serialized third response, the name of the UI event, and the type of the UI event;
generate a fourth cache key based on the second request; and
store the second script object in the persistent storage system in association with the fourth cache key.

7. A system according to claim 1, the processor to execute the processor-executable process steps to:
retrieve the script object from the persistent storage system;
determine the UI event based on the retrieved script object;
execute the UI event to trigger a second request to the network;
receive a second response to the second request from the network;
serialize the second response;
generate a second script object including the Uniform Resource Identifier of the user interface, the serialized second response, the name of the UI event, and the type of the UI event;
generate a second cache key based on the second request; and
store the second script object in the persistent storage system in association with the second cache key.

8. A computer-implemented method comprising:
displaying a user interface on a display;
detecting a User Interface (UI) event associated with the user interface and triggering a request to a network;
generating a cache key based on the UI event;
receiving a response to the request from the network;
serializing the response, serializing the request, and generating a script object including an executable UI event, a Uniform Resource Identifier of the user interface event, a name of the UI event, a type of the UI event, the serialized response and the serialized request, wherein serialization of the response converts the response to a different structured form for storage and deserialization is applied offline to the serialized response before the response is provided to a renderer, wherein the deserialized response is the same as the received response;
storing the script object in a local persistent storage system in association with the cache key
detecting a second UI event associated with the user interface;
determining that the system is offline;
in response to the determination that the system is offline:
generating a second cache key based on the second UI event;
requesting the script object from the persistent storage system based on the second cache key, where the second cache key is identical to the cache key;
receiving the script object from the persistent storage system;
identifying the response included in the script object; and
displaying an image on the display based on the identified response.

9. A method according to claim 8, wherein generating a cache key comprises generating the cache key based on a body of the request and on a Uniform Resource Identifier associated with the request.

10. A method according to claim 8, wherein generating a cache key comprises generating the cache key based on a body of the request and on a Uniform Resource Identifier associated with the request, and
wherein generating the second cache key comprises generating the second cache key based on a body of a second request associated with the second UI event and on a second Uniform Resource Identifier associated with the second request.

11. A method according to claim 8, further comprising:
detecting a third UI event associated with the user interface;

determining that the system is offline;
in response to the second determination that the system is offline:
   generating a third cache key based on the third UI event;
   determining that no script object is stored in the persistent storage system in association with the third cache key;
   transmitting a no content code in response to a second request triggered by the third UI event; and
   adding the third UI event and second request to a queue;
determining that the system is online; and
in response to determining that the system is online:
   executing the third UI event to trigger the second request to the network;
   receiving a third response to the second request from the network;
   serializing the third response;
   generating a second script object including the Uniform Resource Identifier of the user interface, the serialized third response, the name of the UI event, and the type of the UI event;
   generating a fourth cache key based on the second request; and
   storing the second script object in the persistent storage system in association with the fourth cache key.

12. A method according to claim 8, further comprising:
retrieving the script object from the persistent storage system;
determining the UI event based on the retrieved script object;
executing the UI event to trigger a second request to the network;
receiving a second response to the second request from the network;
serializing the second response;
generating a second script object including the Uniform Resource Identifier of the user interface, the serialized second response, the name of the UI event, and the type of the UI event;
generating a third cache key based on the second request; and
storing the second script object in the persistent storage system in association with the third cache key.

13. A system comprising:
executable code of a Web application;
executable code of a service worker;
a Web browser to execute the Web application to:
   render a Web page;
   detect a User Interface (UI) event associated with the Web page; and
   transmit a request to the network based on the Web page and the UI event; and
the Web browser to execute the service worker to:
   generate a cache key based on the UI event;
   receive a response to the request from the network;
   serialize the response, wherein serialization converts the response to a different structured form for storage and deserialization is applied offline to the serialized response before the response is provided to a renderer, wherein the deserialized response is the same as the received response;
   generate a script object including a Uniform Resource Identifier of the user interface, the serialized response, the name of the UI event, and the type of the UI event;
   store the script object in a local persistent storage system in association with the cache key;
   detect a second UI event associated with the Web page;
   determine that the system is offline; and
   in response to determining that the system is offline:
      generate a second cache key based on the second UI event;
      request the script object from the persistent storage system based on the second cache key, where the second cache key is identical to the cache key;
      receive the script object from the persistent storage system;
      identify the response included in the script object; and
      render a second Web page based on the identified response.

14. A system according to claim 13, the Web browser to execute the service worker to:
retrieve the script object from the persistent storage system;
determine the UI event based on the retrieved script object;
execute the UI event to trigger a second request to the network;
receive a second response to the second request from the network;
serialize the second response;
generate a second script object including the Uniform Resource Identifier of the user interface, the serialized second response, the name of the UI event, and the type of the UI event;
generate a third cache key based on the second request; and
store the second script object in the persistent storage system in association with the third cache key.

* * * * *